Patented Apr. 14, 1942

2,279,765

UNITED STATES PATENT OFFICE 2,279,765

PREPARATION OF UREA NITRATE

Charles P. Spaeth, Woodbury, N. J., assignor to E. I. du Pont de Nemours & Company, Wilmington, Del., a corporation of Delaware No Drawing. Application November 9, 1940, Serial No. 365,021

3 Claims. (Cl. 260—553)

This invention relates to a new and improved method for the preparation of urea nitrate.

Urea nitrate is a compound that has assumed some importance as a potential explosive ingredient and as an organic intermediate. The preparation of nitrourea, for example, requires urea nitrate as a starting or intermediate product. The preparation of the latter compound by methods of the prior art has involved the reaction of urea with nitric acid in aqueous solution, the urea nitrate being subsequently separated from the mother liquor. Such a method has a disadvantage in that urea nitrate is soluble in water to a considerable extent. Not only is it impossible to get the desired high initial yield of urea nitrate, when operating in an aqueous medium, but it is difficult also to wash away the impurities present by means of water without undesirable losses of product. A more serious disadvantage comes in the decreased cooling efficiency resulting from the coating of the cooling surfaces with the urea nitrate that separates out.

An object of the present invention is a method for the preparation of urea nitrate offering advantages over methods of the prior art from viewpoints of yields and efficiency. A further object is such a method free from the disadvantages inherent in the employment of an aqueous medium. A still further object is a method wherein no crystallizing medium is necessary, hence no after-cooling of the system is required. A further object is a method characterised by a considerable saving of time. Additional objects will be disclosed as the method is described more in detail hereinafter.

I have found that the foregoing objects are accomplished and the disadvantages of the prior art overcome when urea is caused to react with nitric acid, preferably in a substantially non-aqueous medium, said medium having a relatively low dissolving power for urea nitrate. An additional essential is that the solvent be one which is compatible with nitric acid, that is to say one which forms no unstable nitration or oxidation compounds which would interfere with the smooth functioning of a process of preparing urea nitrate, and one which enters into no vigorous exothermic reaction with the nitric acid. Acetic and propionic acids are examples of solvents which may be employed advantageously according to my invention. Preferably, I use acetic acid because of its favorable properties and its availability.

While acetic or propionic acid of various concentrations may be employed, it is desirable that the solvent be relatively low in water content, since the use of a substantially non-aqueous solvent tends to promote insolubility of the material in the solvent. For this reason, I find it advantageous to use acetic acid, for example, of at least 95% strength. For the same reason, I desirably employ concentrated nitric acid of over 90% strength, and preferably stronger than 95%.

The following examples will serve as specific embodiments of methods of carrying out the invention, though it should be understood that I do not wish to be limited in any way by the details of procedure followed.

*Example 1*

A solution was prepared containing 20 grams of urea in 300 cc. of glacial acetic acid of a strength of 99.5%. To this solution was added 21.5 grams of 97.7% $HNO_3$, when said solution was at a temperature of 18° C. The time of addition of the nitric acid was 6 minutes and the temperature rose to 28° C. The urea nitrate precipitated out immediately on addition of the nitric acid. The solution was cooled to 22° C. over a period of 7 minutes, and the precipitated material was separated by filtration. The urea nitrate was washed on the filter with a total of 95 cc. benzene in three washes, and was then dried. Both benzene and acetic acid were largely recovered for re-use. The amount of dry urea nitrate obtained was 37.76 grams, amounting to 91.9% of theory, and having a nitrate nitrogen content of 11.34%, against a theoretical percentage of 11.39.

*Example 2*

Twenty grams of urea was dissolved in 282 cc. of acetic acid resulting from the run described in Example 1, having a relatively small content of urea nitrate. To this solution, 21.5 grams of 97.7% $HNO_3$ was added. The urea nitrate was precipitated and recovered by substantially the same procedure as in Example 1. The yield of dry material amounted to 97.4% of theory, the increased yield over the previous example being due to the fact that a saturated solution of urea nitrate in acetic acid was used as initial acid solution. The intrate nitrogen content of the material was 11.35%.

*Example 3*

Urea nitrate was prepared by a similar method, except that 300 cc. of 95.5% propionic acid was used in place of acetic acid. The amounts of urea and 97.7% $HNO_3$ were 20 grams and 21.5 grams respectively. The yield of dry urea nitrate was 94.8%, the material having a nitrate nitrogen content of 11.38%. Propionic acid appeared to have the advantage over acetic acid of lower solvent power for urea nitrate.

The preparation of urea nitrate in accordance with the procedures followed in the foregoing examples has several important advantages over the methods of the prior art. First, by the employment of a non-aqueous solvent for urea and one which is substantially a non-solvent for urea nitrate, higher yields of urea nitrate are assured initially when starting with fresh materials. This is true because in aqueous solutions the mother liquor retains a considerable amount of dissolved urea nitrate because of the solubility of the latter in water. Since water or a water-miscible solvent would, in such case, ordinarily be employed for washing the material free from impurities, further loss of product would result. A more serious disadvantage in the use of an aqueous medium for the preparation of urea nitrate arises from the fact that intensive cooling of the solution is then necessary in order to obtain satisfactory yields of product. I have found that aqueous solutions of urea nitrate, when strongly cooled, tend to coat the cooling surfaces to such an extent as to have a decidedly detrimental effect on the efficiency of heat transfer. With the method of my invention, it is apparent that strong cooling is unnecessary in order to obtain good yields, since the reaction medium is substantially a non-solvent for urea nitrate. An additional advantage in the present method comes in the fact that a much shorter time, approximately one-third, is required for carrying out the preparation.

A copending case has been filed covering a related method for the preparation of nitrourea, Serial No. 363,295, filed October 29, 1940.

I have described my invention at length in the foregoing. It should be understood, however, that many variations in details of procedure may be introduced without departure from the scope of the invention. I intend therefore to be limited only by the following patent claims.

I claim:

1. A method for preparing urea nitrate, which comprises dissolving urea in acetic acid, adding nitric acid to the solution, and separating out the precipitated urea nitrate.

2. A method for preparing urea nitrate, which comprises dissolving urea in acetic acid of a concentration above 90%, adding to the solution nitric acid of a strength above 90%, separating the precipitated urea nitrate from the mother liquor, washing said urea nitrate with a solvent for acetic acid, and drying said urea nitrate.

3. A method for preparing urea nitrate, which comprises reacting urea with nitric acid in a liquid medium taken from the group consisting of acetic acid and propionic acid.

CHARLES P. SPAETH.